United States Patent [19]

McMahon

[11] 4,160,237

[45] Jul. 3, 1979

[54] OPTICAL READER FOR MULTILINE IMAGE PROCESSING

[75] Inventor: Donald H. McMahon, Carlisle, Mass.

[73] Assignee: Sperry Rand Corporation, New York, N.Y.

[21] Appl. No.: 874,450

[22] Filed: Feb. 2, 1978

[51] Int. Cl.² ............................................. G06K 9/00
[52] U.S. Cl. ...................... 340/146.3 F; 340/146.3 E; 350/150; 350/285; 356/71; 356/365; 358/285; 356/369
[58] Field of Search ............... 350/147, 148, 150, 194, 350/285; 356/71, 114, 117, 118; 340/146.3 F, 146.3 P, 146.3 E; 358/285, 292, 293

[56] References Cited

U.S. PATENT DOCUMENTS

| 3,502,888 | 3/1970 | Stites | 356/118 |
| 3,563,634 | 2/1971 | Parks et al. | 365/71 |
| 3,653,767 | 4/1972 | Liskowitz | 356/114 |
| 3,753,608 | 8/1973 | Bernal | 350/147 |

Primary Examiner—Leo H. Boudreau
Attorney, Agent, or Firm—Howard P. Terry

[57] ABSTRACT

The polarization of a scanning laser beam is made to oscillate at a relatively high frequency between orthogonal polarization states while being raster scanned across a multiple line pattern at a lower rate. A birefringent element in the optical path causes the two polarization states cyclically to produce light spots of two different sizes at each illuminated point of the image. This difference in spot size produces an oscillating change in the scattered light power when the grey level illuminated by the smaller spot differs from the average grey level of the surrounding area. The polarity of the detected scattered light signal relative to the polarity of the voltage producing the oscillating polarization state is used to classify the surveyed points in the image into a pattern of binary coded numbers which are readily stored or otherwise processed for pattern recognition purposes.

20 Claims, 3 Drawing Figures

OPTICAL READER FOR MULTILINE IMAGE PROCESSING

BACKGROUND OF THE INVENTION

1. Field of the Invention

The invention relates generally to the optical processing of line patterns, of multiple line patterns or of grey scale data that must be processed for pattern recognition purposes and, more particularly, to automatic optical surveying of such patterns for the generation of binary coded data patterns.

2. Description of the Prior Art

The prior art includes optical systems for the analysis or recognition of fingerprint patterns that employ matched optical filtering or cross-correlation techniques for the direct comparison of the image of a fingerprint to be identified with those of prerecorded fingerprint images. In addition, related techniques have enabled comparison between the Fourier transform of the image of a fingerprint to be identified and the prerecorded Fourier transforms of fingerprints. Such optical systems have often involved rapidly rotated slit or grating optical filter elements generally disposed in the Fourier transform plane of an optical processor for cyclically selecting distinct components of the Fourier transform for transfer to an image plane for detection there and subsequent processing. Data representing ridge line angular orientation is generally developed, though the spacing between ridges may also be derived. Representative concepts of this type of recognition apparatus appear in the following United States patents assigned to Sperry Rand Corporation in the name of the present inventor:

U.S. Pat. No. 3,771,124—"Coherent Optical Processor Fingerprint Identification Apparatus", issued Nov. 6, 1973, U.S. Pat. No. 3,771,129—"Optical Processor Fingerprint Identification System", issued Nov. 6, 1973, U.S. Pat. No. 3,873,970—"Fingerprint Identification Apparatus", issued Mar. 25, 1975 (with W. T. Maloney), U.S. Pat. No. 3,882,462—"Fingerprint Recognition Apparatus Using Non-Coherent Optical Processing", issued May 6, 1975, U.S. Pat. No. 3,891,968—"Coherent Optical Processor Apparatus With Improved Fourier Transform Plane Spatial Filter", issued June 24, 1975, and U.S. Pat. No. 3,968,476—"Spurious Signal Removal in Optical Processor Identification Apparatus", issued July 6, 1976.

However, there is a need in certain applications for fingerprint recognition devices having adequate performance but employing reliable relatively inexpensive optical components, thus avoiding rapidly rotating parts to perform specialized filtering functions, which parts in themselves, are delicate and expensive to manufacture and which present problems of proper alignment along an optical axis. While such problems are readily solved as in the systems of the foregoing patents, the present concept is desirable in certain circumstances because it simplifies the optical hardware and represents an approach characterized by a reduction in the number of production problems that the manufacturer must face.

A prior art concept provides a synchronous overlapping raster scan of two colors. One color is used to form a finely focussed spot on the scanned image. The size of this small spot is comparable to or small compared to the image details to be resolved. The second color is used to form a larger or more coarsely focussed spot that is concentric with the small spot and of a size that is large compared to the image details to be resolved. Light scattered from each of the two spots are separated by filters and then directed to different light level detectors. If a white card is illuminated by the two colors at the same radiant power, the light levels detected by each detector will be equal. On the other hand, if there is a fine grating-like pattern on the card and the small spot instantaneously resides on a line of the grating that is darker than the surrounding area average of grey values, the light scattered from the finely focussed light beam will be less than that scattered from the larger area light beam. The difference in scattered light power received by the two detectors may then be used to classify that point on the pattern as black.

Numerous problems are inherent in the two-color concept which can be cured only by using more complex and costly hardware implementations. The light power of both beams must accurately track through lapses of time, the sensitivities of the detectors must track for varying signal strengths, and the light received by both detectors must track as the image is scanned. These and other characteristics must be controlled or calibration is lost. The purpose of this invention is to provide a relatively simple optical reader system that accomplishes essentially the same results as the more complicated prior art devices.

SUMMARY OF THE INVENTION

The present invention is concerned with the automatic optical surveying of grey scale line, multiple line, or fingerprint patterns for the reliable generation of binary coded data patterns which may readily and compactly be stored or processed by conventional digital processing on pattern recognition apparatus. According to the invention, the linear polarization of a substantially monochromatic scanning light beam is made to oscillate at a relatively high rate between two orthogonal polarization states of the same intensity while at the same time being raster scanned across the multiple line pattern to be analyzed at a relatively low rate. A birefringent lens element introduced in the laser optical path causes the two polarization states cyclically to generate spots of light of two different diameters at successive points of the illuminated image. The difference in spot size yields an oscillating change in the level of scattered light when the grey level illuminated by the small spot differs from the grey level illuminated by the larger spot. The polarity of the detected polarization-cycling frequency as detected in the scattered light relative to the polarity of the voltage causing the change in polarization is then used to classify the surveyed points of the image into a pattern of binary coded numbers which are then readily used in conventional data processors for pattern recognition purposes.

DESCRIPTION OF THE PREFERRED EMBODIMENTS

Figure 1:
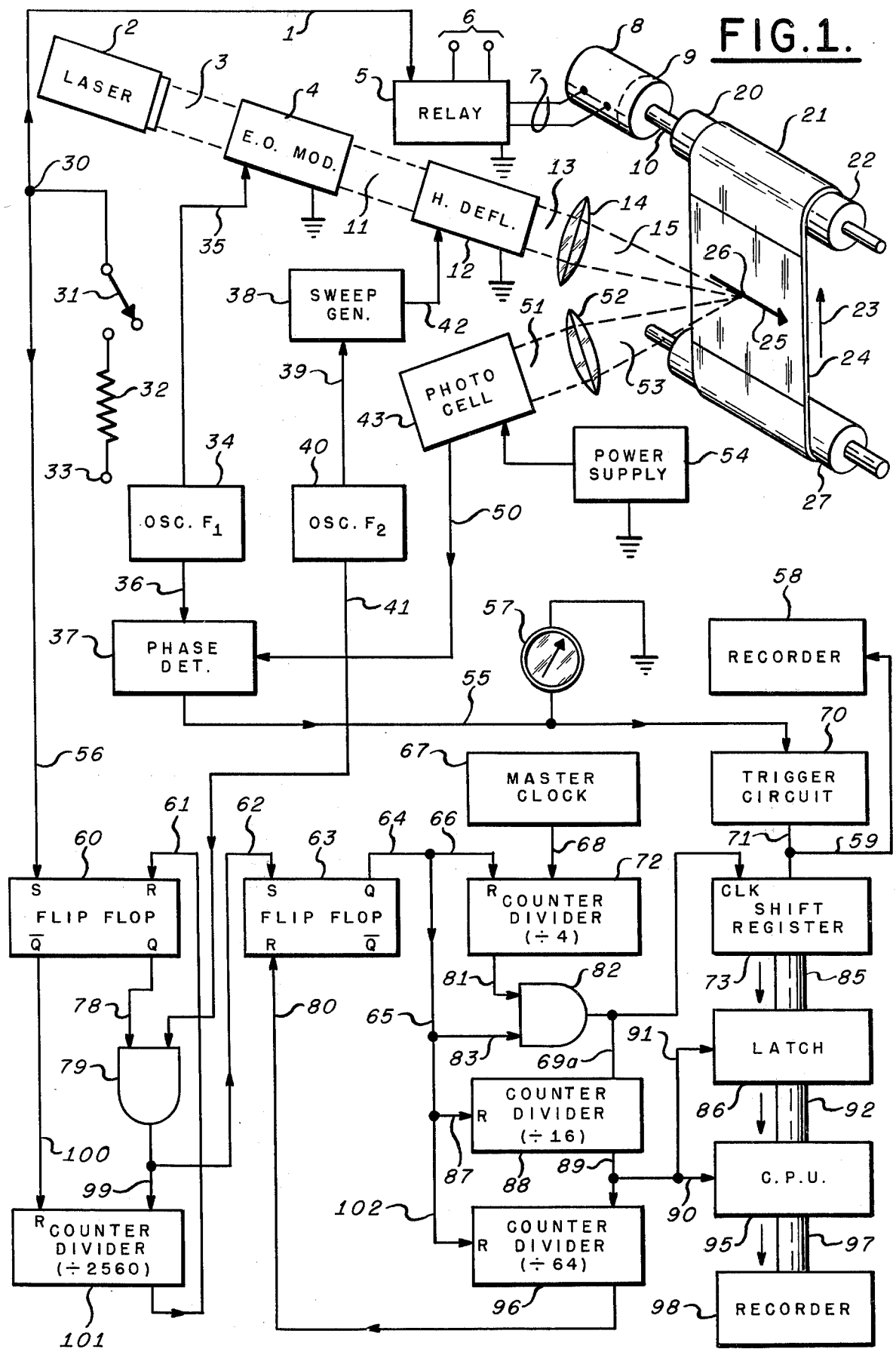
FIG. 1 is a view of the optical system of the invention showing components of the associated signal processing apparatus along with electrical interconnections.

In FIG. 1, a light beam 3 from an operating light source such as a laser 2 is passed through an electrooptical polarization modulator 4 to form light beam 11, which latter beam is, in turn, transmitted through the optical horizontal deflector 12 to form the horizontally scanned light beam 13. The latter beam 13 is shown in an instantaneous position and is converged by lens 14 to form a small circular spot 26 at an arbitrary location on fingerprint 24. The fingerprint may be disposed on a white card at least temporarily affixed to a movable web 21, for example. A variable quantity of light is reflected from the white card and the fingerprint image upon it, depending upon whether the circular light spot 26 lies mainly on an inked fingerprint ridge or mainly between two adjacent ridges, and a portion 53 of the reflected light is collected by lens 52 to form light beam 51 whose intensity is measured by the conventional photocell 43 enabled by its power supply 54. The diameter of the circular light spot 26 is variably and cyclically adjusted to have a mean value of approximately one fingerprint ridge width in magnitude. While the fingerprint 24 is regularly and repeatedly raster scanned by light spot 26 along a horizontal path such as represented by arrow 25, relatively slow scanning is provided at right angles to arrow 25 by rotation of take-up drum 20 in a clockwise sense. Drum 20 is driven by motor 8 through gearing 9 and shafts 10, 22 to wind the web 21 on which print 24 is disposed, progressively removing web 21 from supply drum 27 and winding it on drum 21, for example. In this manner, the immediate print to be examined may progress at right angles to arrow 25 at a regular rate. Other well known means for moving a white card with an inked print 24 in the required manner will be apparent to those skilled in the art. It will also be apparent to those skilled in the art that the web 21 and print 24 will normally lie in a plane perpendicular to that of the drawing, and that a distorted view is shown in the drawing of FIG. 1 merely as a matter of convenience.

The apparatus of the invention is synchronized by several control signals, operation of electrooptical polarization modulator 4 being synchronized by oscillator 34 via lead 35 at frequency $F_1$ which may be, for example 170 KHz. The sweep voltage applied by lead 42 from horizontal sweep generator 38 is controlled at a frequency $F_2$ provided via lead 39 from a second stable oscillator 40. Frequency $F_2$ may be 16 Hz, for example. Frequencies $F_1$ and $F_2$ may be derived alternatively from a common oscillator by the use of appropriate multipliers, frequency $F_1$ being substantially larger than frequency $F_2$. Motor 8 is generally synchronized to the frequency of the commercially available alternating power on leads 6, while the operation of the data processing section in the lower part of FIG. 1 is synchronized in part by $F_1$ oscillator 40 via lead 41 and in part by an internal master clock 67 via lead 68.

The substantially monochromatic light beam 3 supplied by the conventional laser 2, which may be a simple 633 nanometer He-Ne laser, is subjected to cyclic polarization modulation at frequency $F_1$ within conventional electrooptic modulator 4, the energizing beam 11 being characterized by cyclic angular shifting of its plane of linear polarization from substantially vertical to substantially horizontal with no concomitant change in the intensity of the beam. Resonant sine wave excitation of polarization modulator 4 at a peak-to-peak level of 200 volts may be employed, for example, though a square wave driving voltage may alternatively be used. The horizontal deflecting device 12 deflecting light beam 13 may be a simple galvanometer mirror of optical scanner; other reflective or transmission devices such as are commonly employed for optical memory addressing may be substituted, including the devices of the James B. Thaxter U.S. Pat. No. 3,758,199 for a "Piezoelectrically Actuated Light Deflector", issued Sept. 11, 1973 and assigned to Sperry Rand Corporation.

Lens 14 plays a significant role in cooperation with polarization modulator 4. Lens 14 is cut from crystalline birefringent material such as quartz, calcite and lithium niobate to provide different primary focal lengths for different polarization states. To make use of these characteristics, the fingerprint at 24 is placed in a plane that coincides with the focal spot of the first polarization state, but not coplanar with the focal spot of the second polarization state. In this manner, the lens 14 generates a scanned converging beam 15 that forms a small circle of light 26 on print 24 for a first polarization state and a second small but larger diameter light spot 26 for the other polarization state. The larger spot may be from about two to about three times the diameter of the smaller spot. Thus, the polarization shifts rapidly during the course of each horizontal deflection along arrow 25, whereby the important result obtains that the diameter of the light spot 26 shifts rapidly between two extreme values, one larger compared to the line spacing and one small compared to the line spacing. It will be understood that the light diffusely scattered toward photocell 43 by the print 24 is unpolarized even though the light incident on card 24 is linearly polarized either horizontally or vertically, for example. More complex optical systems including ordinary lenses in addition to lenses 14 and 52 may be employed, as will be apparent to those skilled in the art.

Accordingly, it is seen that one state of polarization of light beam 13 produces a small light spot and the orthogonal polarization produces a relatively larger light spot, the spots being disposed coaxially. For a perfectly clear card 24, there will be equal levels of light power reflected into photocell 43 along light beams 53 and 51 as collected by the conventional lens 52 for both spot sizes. This condition will no longer hold, however, in the usual condition when inked fingerprint ridge lines are present. In the latter case, the light power scattered from a spot of one size will be smaller or greater than that scattered from the coaxial light spot of the second size and, thus, a difference signal may be created whose instantaneous magnitude is linearly proportional over the operating range to the difference in the effective reflectivities of the two distinct finger print pattern portions instantaneously illuminated by the two different spots. In the latter situation, if the polarization state of light beam 13 is oscillated at the high frequency rate $F_1$, the normally present difference signal representing the change in reflectivity between successive small and large light spots also oscillates at frequency $F_1$. The phase of the difference signal will be positive if the reflectivity of the central light spot is greater than the average reflectivity of the larger light spot, and vice versa. Thus, the reflection from one spot may be identified with respect to the other by supplying the output of photocell 43 after appropriate amplification to one input 50 of a conventional phase detector 37, whose second or reference input 36 is derived from the $F_1$ oscillator 34 via lead 36. A variable magnitude, variable polarity output on lead 55 is generated by the phase detector or phase sensitive amplifier 37 for use by the signal processing system of the lower half of FIG. 1. Phase sensitive amplifier 37 produces as output on lead 55 whose signal is indicative of the instantaneous phase relation between the photocell output signal and the reference signal on lead 36. For example, the configuration may readily by connected so that a small, darker than average, spot on print 24 will produce a negative signal on lead 55 and, if the reflection is from a small, lighter than average spot on print 24, a positive signal appears on lead 55 which may be displayed, for example, on the zero center d.c. meter 57.

Figure 2:
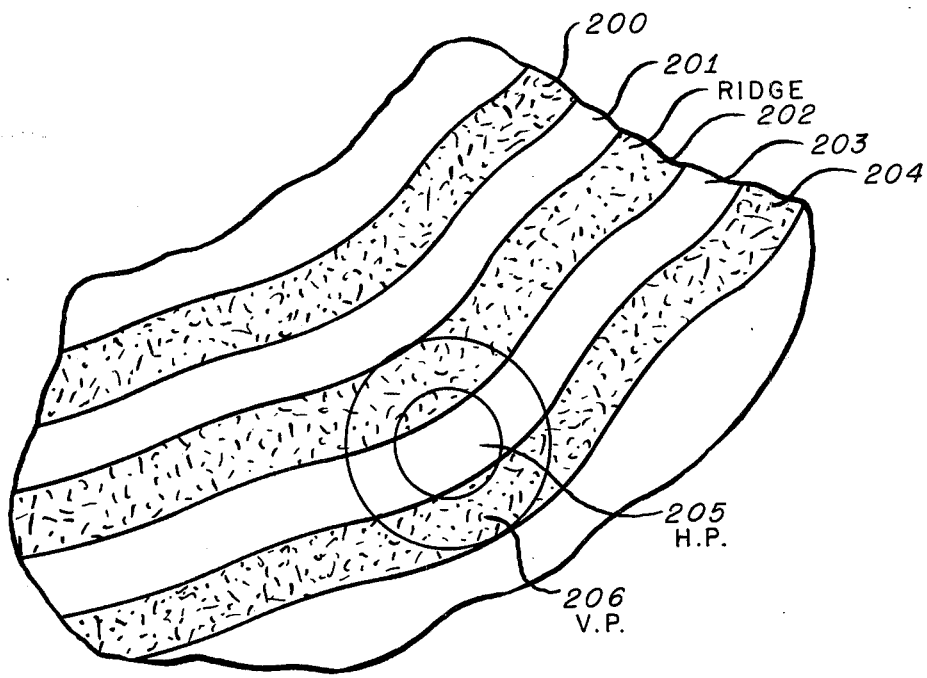
FIGS. 2 and 3 are pictorial representations of portions of a fingerprint pattern useful in explaining the operation of the invention.
Figure 3:
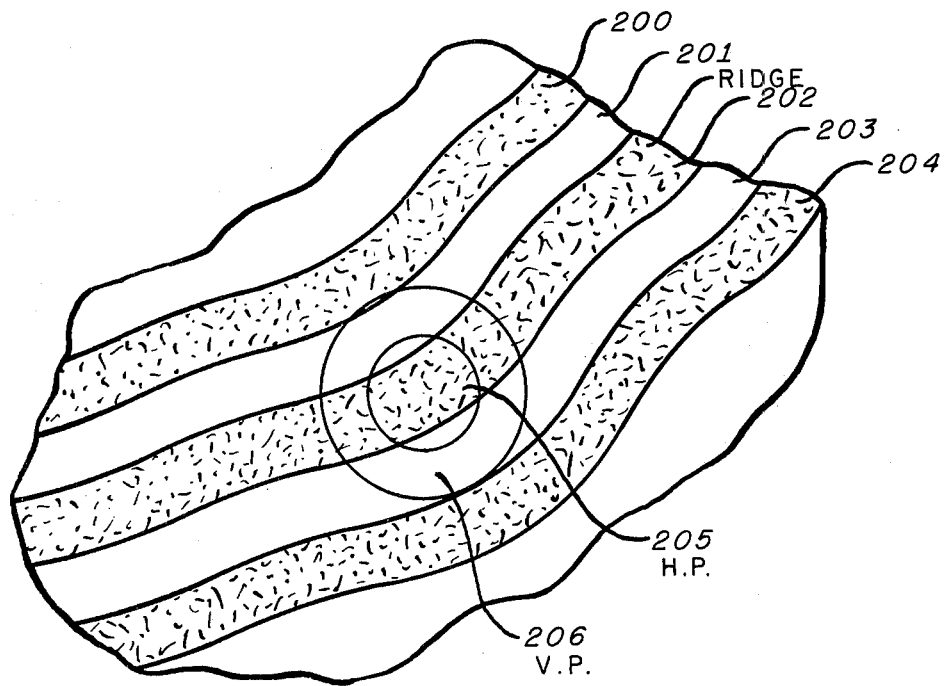

FIGS. 2 and 3 show the locations of the coaxially super-imposed orthogonally polarized light spots 205, 206 as they would appear in striking different areas of a fingerprint or other similar image. A typical situation is the side-by-side generally conformal relation that occurs in the case of a fingerprint pattern having side-by-side ink ridges 200, 202, 204 with non-inked separating valleys 201, 203. Assume, for purposes of discussion, that the small central light spot is produced by horizontally polarized light and that the larger concentric spot is produced by vertically polarized light. In FIG. 2, the central light spot 205 falls primarily in valley 203 between two adjacent inked ridges 202, 204. However, it is easily recognized that a considerable portion of the alternating large light spot 206 falls on the black areas of the inked ridges 202, 204. Since the alternating light spots come from the same laser source 2, they are formed by equal light powers. The power reflected from the central horizontally polarized spot 205 will be the greater and the resultant positive phase a.c. signal indicates that the corresponding central area 205 of the fingerprint has greater reflectivity than the average of the area in the vertically polarized spot 206. In FIG. 3, the reverse situation is illustrated, the central spot 205 falling on a black ridge line 202, while a major part of the larger spot 206 falls on uninked areas 201, 203. Phase sensitive amplifier 37 converts the sensed signals into a negative signal, representing the fact that the reflectivity of the area convered by the central spot 205 is lower than that covered by the larger light spot 206. Phase sensitive amplifier 37 includes conventional filter means to exclude from its input any signals of frequency $F_1$ and also has relatively high gain so that its output 55 may readily be coupled to a trigger circuit 70 such as a conventional Schmidt trigger circuit. In this manner, the entire fingerprint pattern is classified by trigger circuit 70 into a binary 0 or 1 code depending on whether or not the central area 205 has a reflectivity greater or less than that of the area convered by the large light spot 206. The latter is normally the more nearly constant of the two, serving, in effect, as a measure of the local average reflectivity. The digital output of trigger circuit 70 may be passed directly via lead 59 to a suitable recorder 58 or via lead 71 to the processor system.

Switch 31 may be used to start operation of all elements of the apparatus, including the precessor system yet to be described. For example, closure of switch 31 is used to apply a voltage from a source (not shown) coupled through terminal 33 and through resistor 32 and junction 30 to operate the relay 5. The latter starts motor 8 via leads 7, being driven from a commercially available a.c. source tied to leads 6. The card 24 is then caused to move steadily past the locus 25 of scanning of light beam 15. Motor 8 may be stopped at the appropriate time by use of a thermal time delay within relay 5.

The same initiating signal from switch 31 is applied through junction 30 and lead 56 to the set terminal of a conventional flip flop 60. A suitable delay may be injected in lead 56, if desired. The $\bar{Q}$ output of flip flop 60 is coupled to the reset terminal of divider 101, while the Q terminal of flip flop 60 is coupled to one input 78 of AND gate 79, whose second input is an impulse synchronized with the operation of horizontal scanner 12 appearing on lead 41. Either oscillator 40 or sweep generator 38 may be used in a conventional way to produce the desired synchronizing pulse on lead 41 during the retrace of the sweep. The output of divider 101 on lead 61 is returned to the reset terminal of flip flop 60.

The output of AND gate 79 on lead 62 is supplied to the set terminal of a second flip flop 63 whose Q output on lead 64 serves several functions; via lead 66, it is coupled to the reset terminal of a second divider 72. Via leads 65 and 83, it is coupled to one input of AND gate 82. Via lead 87, it is coupled to the reset terminal of a third divider 88, and via lead 102, it is coupled to the reset terminal of a third divider 96.

A primary input on lead 68 of divider 72 are the clock pulses of master clock 67, while the output of divider 72 is connected to the second input 81 of AND gate 82. Divider 88 supplies pulses to divider 96 via lead 89; the output of divider 96 is coupled by lead 80 back to the reset terminal of flip flop 63. Trigger circuit 70 produces coded 0 or binary 1 outputs on lead 71 for input to shift register 73 along with the output of AND gate 82 as a second input on lead 69 that is used to clock data into shift register 73. Data accumulated in shift register 73 is coupled by multiple leads 85 to latch 86 and thence via multiple leads 92 to a central processor or digital computer unit 95. Latch 86 and central processor unit 95 are under the control of the signals on the output lead 89 of divider 88 which is coupled respectively via leads 90 and 91. The accumulated data may be stored in unit 95 or may be processed and extracted therefrom via multiple leads 97 for print out by a conventional recorder 98.

Depression of the initiate switch 31 sets flip flop 60 via lead 56; this event permits the horizontal sweep synchronizing pulse to pass along lead 41 through AND gate 79. Divider counter 101, which may be a divide-by-2560 device, counts the horizontal synchronizer pulses on lead 41, shutting off flip flop 60 at the end of 2560 horizontal scans of light beam 13.

The particular horizontal sweep synchronizer signals are also passed by lead 62 to the set input of the second flip flop 63 that initiates the recording of binary data for a particular horizontal scan event. The Q output of the second flip flop 63 is used to reset the three divider counters 72, 88, and 96. The divide-by-four counter 72 serves to reduce the time jitter between the pulses on line 81 derived from the master clock pulses and the time of arrival of the selected asynchronous horizontal sweep synchronizer pulses on leads 66 and 83. Master clock 67 therefore operates at a rate four times faster than the rate at which binary data is extracted from the fingerprint image pattern.

The setting of the second flip flop 63 enables clock pulses to be received by shift register 73 on line 69 that allow the binary signal level to be supplied from Schmidt trigger circuit 70 via lead 71 to be clocked into the shift register 73, which may be a conventional 16 bit serial-in, parallel-out shift register. As has previously been described, the binary image data has been generated by passing the analog signal from phase sensitive amplifier 37 through trigger circuit 70. After 16 bits of image data have been clocked through shift register 73, the divide-by-16 counter 88 driven from AND gate 82 via line 69a supplies an output clock pulse on lead 89, enabling the contents of shift register 73 to be passed into the sixteen bit latch circuit 86. The same clock pulse passes via lead 90 to indicate to central processor or computer unit 95, if it is present, the fact that new image data in binary form is available in the 16 bit latch 86 for reading in the conventional manner into memory sections of computer 95 and thence for processing or for print out, for example, by recorder 98, if desired. After 64 16-bit words are sent to the computer, flip flop 63 is reset in its off state by the output of divider 96 on lead 80 until the beginning of the next scan line 25.

In the example described, it is assumed that an array of image data of 1024 picture elements by 2560 picture elements is read into processor 95, for example, after the initiate switch 31 is depressed. This array size, which is only one example of array sizes which may be used according to the present invention in fingerprint recognition or in the analysis of other similar like patterns, is particularly suitable for reading ten rolled ink impressions from white cards, allowing a 512 by 512 array size for each fingerprint. According to the present invention, the binary image data may be sent to and stored in the main central storage section of a central processing unit, after which processing steps may be carried out on the data to extract information useful for the comparison of fingerprint patterns, after which the data may be printed out or otherwise conventionally employed according to the immediate problem at hand.

Accordingly, it is seen that the invention is a novel automatic system for analysis of multiple line or fingerprint patterns by the reliable generation of binary coded patterns for storage or for processing in pattern recognition apparatus. The invention overcomes problems of the prior art apparatus by avoiding the use of expensive or complex optical parts that are delicate and expensive to manufacture and properly to align. Furthermore, it avoids the serious deficiences of the dual color system, the need to use two lasers of differing colors, avoiding all problems which cause its calibration to drift disasterously and its relatively high cost.

While the invention has been described in its preferred embodiments, it is understood that the words which have been used are words of description rather than of limitation and that changes may be made within the purview of the appended claims without departing from the true scope and spirit of the invention in its broadest aspects.

What is claimed is:

1. In optical pattern inspection apparatus:
    source means for generating a light beam, first signal generator means,
    modulator means responsive to said first signal generator means for cyclically shifting the polarization of said light beam between first and second polarization states,
    focusing means responsive to said first and second polarization states for cyclically forming, at least at one point on said pattern, successive first and second spots of light of respective first and second different diameters,
    light detector means for receiving light scattered by said pattern when illuminated by said first or second spots of light,
    phase detector means responsive to said light detector means and to said first signal generator means for providing a variable polarity output representative of the difference in light scattered by said pattern from said first and second spots of light, and
    utilization means for utilizing said variable polarity output.

2. Apparatus as described in claim 1 wherein:
    said first spot of light is formed by light of a first polarization,
    said second spot of a light is formed by light of a second polarization orthogonal to said first polarization, and
    said second spot of light is larger in diameter than said first spot of light.

3. Apparatus as described in claim 2 for inspection of adjacent pattern lines having a side-by-side generally conformal relation wherein said first spot of light is selected to have a diameter approximately equal to the average width of said adjacent pattern lines.

4. Apparatus as described in claim 3 wherein said second spot of light has a diameter falling in the range from about twice to about thrice that of said first spot of light.

5. Apparatus as described in claim 1 wherein said utilization means comprises processor means for converting said variable polarity output into binary data representative thereof and for storing same.

6. Apparatus as described in claim 1 wherein said source means comprises a monochromatic light source.

7. Apparatus as described in claim 1 wherein said first and second polarization states comprise orthogonal polarization states.

8. Apparatus as described in claim 7 wherein said collimator means comprises first lens means.

9. Apparatus as described in claim 8 wherein said first lens means is formed of a birefringent optically transparent material.

10. Apparatus as described in claim 9 wherein at least second lens means is interposed between said pattern and said light detector means for directing light scattered by said pattern into said light detector.

11. Apparatus as described in claim 1 further including means for cyclically scanning said light beam in regular sequence over said pattern whereby successive corresponding points on said pattern are successively illuminated by said first and second spots of light of respective first and second diameters.

12. Apparatus as described in claim 11 wherein said means for cyclically scanning comprises:
    second signal generator means,
    deflector means responsive to said second signal generator means for cyclically deflecting said light beam along a first direction, and
    motor means for moving said pattern in second direction normal to said first direction.

13. Apparatus as described in claim 12 wherein said second signal generator means includes:
    oscillator means, and
    sweep wave generator means responsive to said oscillator means.

14. Apparatus as described in claim 12 wherein said first signal generator means is characterized by generating an output wave of substantially higher frequency than the output wave of said second signal generator means.

15. Apparatus as described in claim 12 wherein said utilization means comprises processor means for converting said variable polarity output into binary data representative thereof and for storing same.

16. Apparatus as described in claim 15 wherein said processor means includes:
   trigger circuit means responsive to the output of said phase detector means,
   shift register means,
   master clock means,
   first counter means for counting a predetermined number of cycles of the output of said second signal generator means for generating scan end pulse,
   bistable circuit means having a set terminal responsive to said scan end means,
   second counter means responsive to said bistable circuit means and to said master clock means, and
   shift register means responsive to said second counter means, to said trigger circuit means, and to said bistable circuit means.

17. Apparatus as described in claim 16 further including manual means for initiating operation of said first counter means.

18. Apparatus as described in claim 17 further including:
   latch means,
   storage means, and
   third counter means responsive to said scan end pulse for generating enabling signals for transfer of said binary data from said shift register means into said latch means.

19. Apparatus as described in claim 18 further including fourth counter means responsive to said third counter means for resetting said bistable circuit means.

20. Apparatus as described in claim 19 wherein said third counter means is further adapted to enable transfer of said binary data from said latch means into said storage means.

* * * * *